(12) United States Patent
Hermanson et al.

(10) Patent No.: US 11,358,775 B2
(45) Date of Patent: Jun. 14, 2022

(54) PACKING MATERIAL AND METHOD OF MANUFACTURING THE PACKING MATERIAL

(71) Applicant: Terry Hermanson, New York, NY (US)

(72) Inventors: Terry Hermanson, New York, NY (US); Haung Meng-Suen, Hong Kong (CN)

(73) Assignee: Terry Hermanson, New York, NY (US)

( * ) Notice: Subject to any disclaimer, the term of this patent is extended or adjusted under 35 U.S.C. 154(b) by 0 days.

(21) Appl. No.: 17/354,477

(22) Filed: Jun. 22, 2021

(65) Prior Publication Data
US 2022/0024667 A1 Jan. 27, 2022

Related U.S. Application Data

(62) Division of application No. 17/197,889, filed on Mar. 10, 2021, now Pat. No. 11,161,668.
(Continued)

(51) Int. Cl.
*B65D 81/02* (2006.01)
*B29C 43/00* (2006.01)
(Continued)

(52) U.S. Cl.
CPC .......... *B65D 81/025* (2013.01); *B29C 43/003* (2013.01); *B31D 5/006* (2013.01);
(Continued)

(58) Field of Classification Search
CPC .. B31D 5/0039; B31D 5/0043; B31D 5/0052; B31D 5/0056; B31D 5/02; B31D 5/04;
(Continued)

(56) References Cited

U.S. PATENT DOCUMENTS

| 1,189,140 A | 6/1916 | Lane |
| 2,924,154 A | 2/1960 | Russell et al. |

(Continued)

FOREIGN PATENT DOCUMENTS

| DE | 40 25 257 C2 | 9/1992 |
| DE | 42 25 143 A1 | 2/1994 |

(Continued)

OTHER PUBLICATIONS

Comprehensive Guide to cushioning and void fill for shipping packaging, Internet Archive of https://www.ecoenclose.com/Definitive-Guide-to-Void-Fill-and-Cushioning/ (captured Sep. 18, 2019), available at https://web.archive.org/web/20190918180012/https://www.ecoenclose.com/Definitive-Guide-to-Void-Fill-and-Cushioning/.

(Continued)

*Primary Examiner* — Dariush Seif
(74) *Attorney, Agent, or Firm* — Venable LLP

(57) ABSTRACT

A packing material including a plurality of discrete cushioning elements and methods for making the same. The discrete cushioning elements may be cellulosic cushioning elements. A flexible linkage may connect the plurality of discrete cushioning elements in the packing material. The packing material may also include a bottom cellulosic sheet connected to a top cellulosic sheet with the plurality of cellulosic cushioning elements positioned between the top cellulosic sheet and the bottom cellulosic sheet. The packing material may also be a molded packing material that includes bonds comprising adhesive and cellulosic fibers. The adhesive and cellulosic fibers of the bonds may be dispersed between the folds of each of the cellulosic cushioning elements.

23 Claims, 14 Drawing Sheets

Related U.S. Application Data

(60) Provisional application No. 63/054,853, filed on Jul. 22, 2020.

(51) Int. Cl.
  *B31D 5/00* (2017.01)
  *B65D 81/09* (2006.01)
  *B29K 105/00* (2006.01)
  *B29L 31/00* (2006.01)

(52) U.S. Cl.
  CPC ......... *B31D 5/0039* (2013.01); *B31D 5/0043* (2013.01); *B31D 5/0073* (2013.01); *B65D 81/09* (2013.01); *B29K 2105/0097* (2013.01); *B29K 2105/25* (2013.01); *B29L 2031/712* (2013.01); *B31D 2205/0023* (2013.01); *B31D 2205/0058* (2013.01); *B31D 2205/0064* (2013.01)

(58) Field of Classification Search
  CPC .......... B31D 5/0073; B31D 2205/0023; B31D 2205/0058; B29K 2105/0097; B29K 2105/25; B29L 2031/712; B65D 81/025; B29C 43/003
  See application file for complete search history.

(56) References Cited

U.S. PATENT DOCUMENTS

| | | | |
|---|---|---|---|
| 2,978,006 A | 4/1961 | Clemens | |
| 3,074,543 A | 1/1963 | Stanley | |
| 3,509,797 A * | 5/1970 | Johnson | B31D 5/0047 53/502 |
| 3,650,877 A * | 3/1972 | Johnson | B65D 81/09 428/222 |
| 3,655,500 A | 4/1972 | Johnson | |
| 4,644,733 A | 2/1987 | Dolinar | |
| 4,680,918 A | 7/1987 | Lovell | |
| 4,937,131 A * | 6/1990 | Baldacci | B65D 65/44 428/129 |
| 5,312,665 A | 5/1994 | Pratt et al. | |
| 5,340,638 A | 8/1994 | Sperner | |
| 5,468,556 A | 11/1995 | Fuss et al. | |
| 5,568,867 A * | 10/1996 | Lencoski | B65D 81/09 206/521 |
| 5,569,519 A * | 10/1996 | Ervay | D04H 1/02 428/156 |
| 5,595,811 A * | 1/1997 | Stout, Jr. | B65D 81/09 206/521 |
| 5,623,815 A | 4/1997 | Hornstein et al. | |
| 5,636,744 A | 6/1997 | Hirose | |
| 5,639,543 A | 6/1997 | Isoda et al. | |
| 5,658,624 A | 8/1997 | Anderson et al. | |
| 5,674,344 A | 10/1997 | Thompson et al. | |
| 5,826,404 A | 10/1998 | Fuss et al. | |
| 5,900,119 A | 5/1999 | Goers et al. | |
| 5,944,192 A | 8/1999 | Weder | |
| 5,992,637 A | 11/1999 | Weder | |
| 6,067,779 A * | 5/2000 | Weder | B65D 81/05 53/472 |
| 6,128,889 A | 10/2000 | Fuss | |
| 6,254,945 B1 | 7/2001 | Simmons | |
| 6,298,637 B1 | 10/2001 | Weder | |
| 6,385,949 B2 | 5/2002 | Weder | |
| 6,532,721 B1 | 3/2003 | Weder | |
| 6,546,701 B2 | 4/2003 | Weder et al. | |
| 6,632,165 B1 * | 10/2003 | Letourneau | B31D 5/0047 493/464 |
| 6,752,910 B2 | 6/2004 | Sato et al. | |
| 6,871,480 B1 | 3/2005 | Goodrich | |
| 7,651,455 B2 | 1/2010 | Yampolsky et al. | |
| 7,803,100 B2 * | 9/2010 | Lu | B31D 5/0047 493/464 |
| 8,052,037 B2 | 11/2011 | Bussey, III et al. | |
| 8,146,748 B2 | 4/2012 | Vulpitta | |
| 8,360,949 B2 | 1/2013 | Wetsch et al. | |
| 8,763,667 B2 | 7/2014 | De Luca | |
| 8,900,111 B2 | 12/2014 | Wetsch et al. | |
| 8,999,490 B2 | 4/2015 | Kung et al. | |
| 9,205,621 B2 | 12/2015 | Cheich | |
| 9,315,312 B2 | 4/2016 | De Luca et al. | |
| 9,427,928 B2 | 8/2016 | Arora et al. | |
| 9,457,982 B2 * | 10/2016 | Wetsch | B65H 45/06 |
| 9,688,044 B2 * | 6/2017 | Deis | B65D 81/127 |
| 10,099,836 B2 | 10/2018 | Cheich | |
| 10,357,936 B1 | 7/2019 | Vincent et al. | |
| 10,392,177 B2 | 8/2019 | Lantz | |
| 10,766,220 B2 | 9/2020 | Deis et al. | |
| 10,766,221 B2 | 9/2020 | Deis et al. | |
| 10,792,882 B2 | 10/2020 | Wetsch et al. | |
| 10,828,859 B2 * | 11/2020 | Ciasullo, Jr. | B31D 5/0047 |
| 11,123,943 B2 * | 9/2021 | Cheich | B31D 5/0047 |
| 11,161,668 B1 * | 11/2021 | Hermanson | B31D 5/0043 |
| 2002/0040859 A1 | 4/2002 | Weder | |
| 2003/0051819 A1 | 3/2003 | Moustier | |
| 2004/0050743 A1 * | 3/2004 | Slovencik | B31D 5/0052 206/521 |
| 2004/0052988 A1 * | 3/2004 | Slovencik | B31D 5/0052 428/34.2 |
| 2004/0108243 A1 * | 6/2004 | Jeannin | B31D 5/0043 206/584 |
| 2007/0082181 A1 | 4/2007 | Jung | |
| 2009/0082187 A1 * | 3/2009 | Cheich | B65D 81/03 493/350 |
| 2011/0053743 A1 * | 3/2011 | Wetsch | B31D 5/0052 493/29 |
| 2012/0097067 A1 | 4/2012 | Fascio | |
| 2012/0165172 A1 * | 6/2012 | Wetsch | B65H 35/008 493/352 |
| 2013/0313277 A1 * | 11/2013 | Stewartson | B31D 5/0043 221/1 |
| 2014/0155241 A1 * | 6/2014 | Cheich | B65H 45/04 493/405 |
| 2016/0060014 A1 * | 3/2016 | Timmers | B31C 11/02 206/591 |
| 2018/0126686 A1 | 5/2018 | Nelson et al. | |
| 2018/0264768 A1 * | 9/2018 | Haug | B31B 50/592 |
| 2018/0319116 A1 * | 11/2018 | Haug | B65B 29/022 |
| 2020/0061951 A1 * | 2/2020 | Slovencik | B31D 5/0052 |
| 2020/0115087 A1 | 4/2020 | Hagestedt et al. | |
| 2020/0139661 A1 * | 5/2020 | Greenwell | B31D 5/0052 |

FOREIGN PATENT DOCUMENTS

| | | |
|---|---|---|
| JP | H06-247471 A | 9/1994 |
| JP | H08-244853 A | 9/1996 |
| JP | 2002-225946 A | 4/2002 |
| WO | 92/04253 A1 | 3/1992 |
| WO | 94/12576 | 6/1994 |
| WO | 97/09248 | 3/1997 |

OTHER PUBLICATIONS

ExpandOS, https://expandos.com, visited Oct. 29, 2020.
"Paper Packaging Applications", Paper Packaging Systems, https://www.paperpackagingsystems.com/paper-packaging-applications-paper, visited Oct. 29, 2020.
"Crinkle Cut Fill", Bags and Bows Online, https://www.bagsandbowsonline.com/retail-packaging/search?Ntt=crinkle cut fill, visited Oct. 29, 2020.
Partial International Search Report and Written Opinion dated Oct. 1, 2021, in International Application No. PCT/US2021/043719.

* cited by examiner

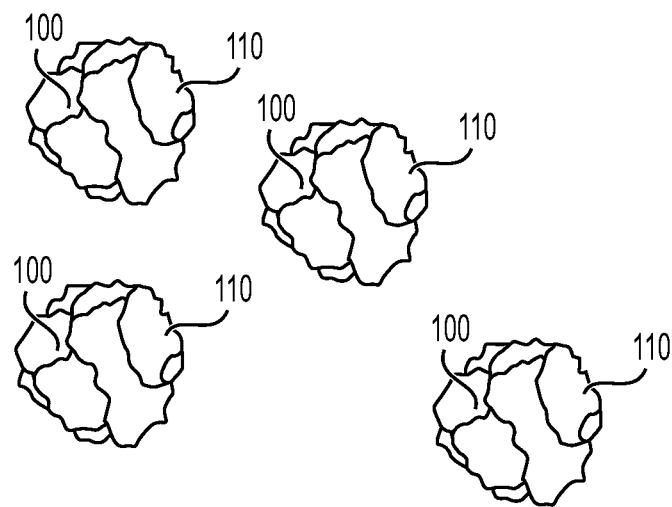
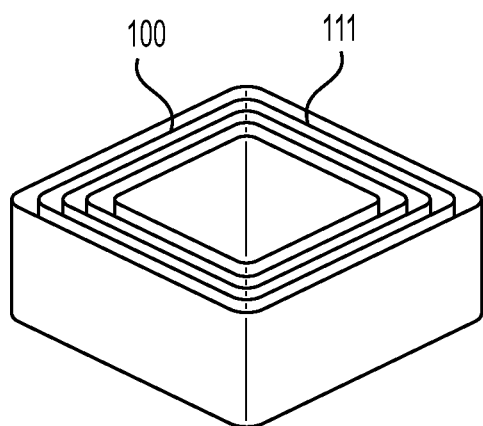
FIG. 1A  FIG. 1B
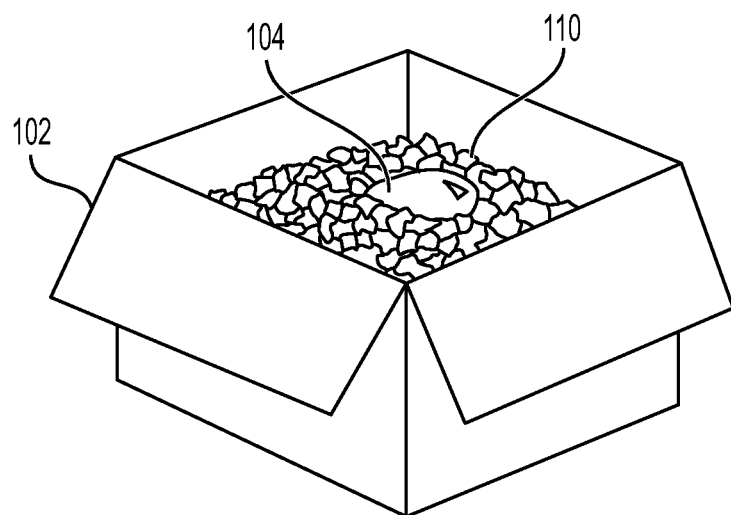
FIG. 2

PACKING MATERIAL AND METHOD OF MANUFACTURING THE PACKING MATERIAL

CROSS-REFERENCE TO RELATED APPLICATIONS

This application is a divisional of U.S. patent application Ser. No. 17/197,889, filed Mar. 10, 2021. U.S. patent application Ser. No. 17/197,889 claims the benefit under 35 U.S.C. § 119(e) of U.S. Provisional Patent Application No. 63/054,853, filed Jul. 22, 2020, and titled "PACKING MATERIAL AND METHOD OF MANUFACTURING THE PACKING MATERIAL," the entirety of which is incorporated herein by reference.

FIELD OF THE INVENTION

The invention relates to packing material, particularly packing material that includes a plurality of discrete cushioning elements made from paper. The invention is also related to methods of manufacturing the same.

BACKGROUND OF THE INVENTION

Various packing materials are used to secure items in shipping containers, including cardboard boxes, to thereby prevent damage to these items if they move within the shipping container during shipment or other impacts during shipping, such as being dropped or hit. Such packing materials include bubble wrap, expanded polystyrene (polystyrene foam), and other plastic foam packing, which may be molded into blocks or into other shapes, peanuts, and inflated plastic bags (also known as air pillows). These plastic products may be discarded as waste after they have been used during shipping. Plastic waste takes a long time to decompose and produces carbon dioxide in the decomposition process. In addition, polystyrene foam does not readily biodegrade, and may take many, many years to break down. With an increased awareness of the negative effects of plastics and polystyrene foam on the environment, however, consumers are increasingly seeking to use environmentally-friendly, recyclable, and biodegradable products as a packing material. There are desired environmentally-friendly, recyclable, and biodegradable products that provide sufficient cushioning effects at an affordable cost.

SUMMARY OF THE INVENTION

In one aspect, the invention relates to a packing material including a plurality of cellulosic cushioning elements and bonds bonding the plurality of cellulosic cushioning elements to each other. Each cellulosic cushioning element of the plurality of cellulosic cushioning elements has a plurality of folds and is formed into a shape. The bonds comprise adhesive and cellulosic fibers. The adhesive and cellulosic fibers of the bonds are dispersed between the folds of each of the cellulosic cushioning elements.

In another aspect, the invention relates to a method of manufacturing molded packing material. The method includes filling a mold with a plurality of cellulosic cushioning elements; applying an aqueous slurry of cellulosic fibers and adhesive to the plurality of cellulosic cushioning elements in the mold; drying the aqueous slurry and the plurality of cellulosic cushioning elements to form a molded packing material; and removing the molded packing material from the mold.

In a further aspect, the invention relates to a method of manufacturing packing material. The method includes providing a cellulosic sheet. The cellulosic sheet has a thickness and a face surface. The face surface has a surface area. The cellulosic sheet has a thickness direction and an orthogonal direction that is orthogonal to the thickness direction. The method also includes compressing the cellulosic sheet to form a compressed cellulosic sheet; and twisting the compressed cellulosic sheet to form a crumpled cellulosic sheet.

These and other aspects of the invention will become apparent from the following disclosure.

BRIEF DESCRIPTION OF THE DRAWINGS

FIG. 1A shows a cellulosic cushioning element that can be used as a packing material according to a preferred embodiment of the invention. FIG. 1B shows an alternative cellulosic cushioning element that can be used as the packing material.

FIG. 2 is a shipping box containing an item and a plurality of the cellulosic cushioning elements in FIG. 1A.

FIG. 3A shows a first step, FIG. 3B shows a second step, FIG. 3C shows a third step, and FIG. 3D shows a fourth step.

FIG. 4A shows a first step, FIG. 4B shows a second step, FIG. 4C shows a third step, and FIG. 4D shows a fourth step.

FIG. 6A is a cellulosic cushioning element that is produced without shaping by the feeding rollers, and FIG. 6B is a cellulosic cushioning element that is produced with the feeding rollers shown in FIG. 5.

FIG. 7A shows one way the linkage is attached to the cellulosic cushioning elements, and FIG. 7B shows another way the linkage is attached to the cellulosic cushioning elements.

DETAILED DESCRIPTION OF THE PREFERRED EMBODIMENTS

Figure 3A:
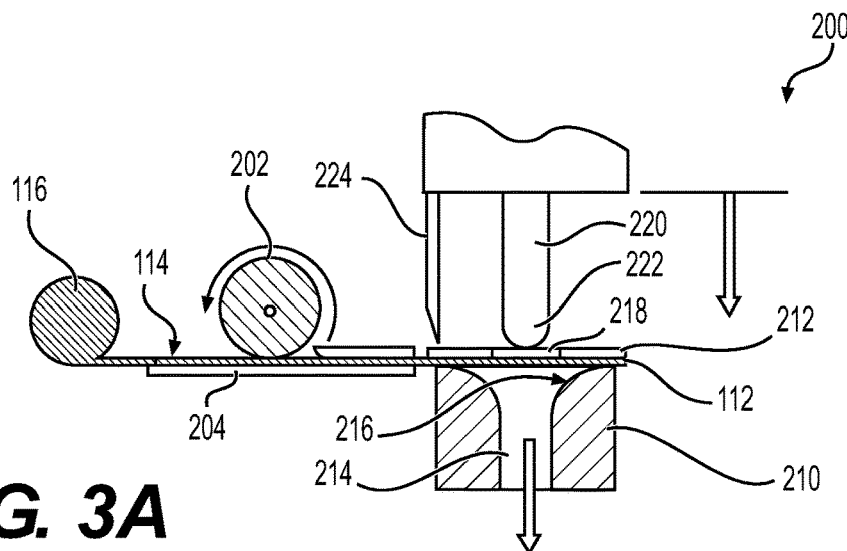
FIGS. 3A-3D show a method and machine used to manufacture the cellulosic cushioning element shown in FIG. 1A.

The packing materials disclosed herein utilize a cushioning element 100 as a base material. FIG. 1A shows a preferred cushioning element 100 that may be used in the packing materials discussed further below. This cushioning element 100 is preferably a cellulosic cushioning element 110, being formed from paper composed of cellulosic fibers. Other suitable cushioning elements 100, as will be described in certain embodiments below, may also be used in the packing materials discussed herein. Paper is a preferred material used for the cellulosic cushioning element 110, as paper is biodegradable. The paper used herein is preferably recycled paper (e.g., previously-used paper). Various suitable basis weights and thicknesses may be used for the cellulosic cushioning elements 110 discussed herein and they may be varied depending upon application. As will be described further below, the paper is preferably crumpled into a shape that is preferably ball-like or sphere-like or cylindrical. The cellulosic cushioning element 110 may be relatively small in size, such as approximately 0.25 inch in diameter, or relatively large in size, such as approximately one inch in diameter. But such sizes are exemplary, and various other suitable diameters may be used. The crumpled cellulosic cushioning element 110 thus includes a plurality of folds and crevices or air pockets formed between the folds of the cellulosic cushioning element 110.

An alternative cellulosic cushioning element 111 is shown in FIG. 1B. The paper used to form the alternative cellulosic cushioning element 111 may be cut into thin strips (for example, 0.25 inch in width) and then folded a plurality of times into a shape to form the alternative cellulosic cushioning element 111. The alternative cellulosic cushioning element 111 is thus folded to form a geometric shape, such as the square, shown in FIG. 1B. But other suitable geometric shapes may be formed. As with the cellulosic cushioning element 110, the alternative cellulosic cushioning element 111 includes a plurality of folds and air pockets formed between the folds and strips of paper.

The invention is not limited, however, to the sizes and shapes described above and shown in FIGS. 1A and 1B. The cellulosic cushioning element 110 and alternative cellulosic cushioning element 111 may also be crumpled or folded to form elements having other shapes or forms including, for example, the form shown in FIG. 6A, below. The alternative cellulosic cushioning element 111 may be used in place of the crumpled cellulosic cushioning element 110 in each of the packing materials discussed further below.

These cellulosic cushioning elements 110 may be used on their own as packing material. FIG. 2 shows, for example, a shipping box 102 that has an item-to-be-shipped 104 placed therein. The shipping box 102 may be any suitable shipping box including a carboard box. The cellulosic cushioning element 110 may be placed in the shipping box 102 to surround the item-to-be-shipped 104. The cellulosic cushioning element 110 is elastically deformable to absorb energy and protect the item-to-be-shipped 104 but, even when crushed, provides additional energy (shock) absorbing to protect the item-to-be-shipped 104. Factors impacting the amount of energy absorbed that may be modified for the desired protection include the weight of the paper, the volume or size (e.g., diameter) of the cellulosic cushioning element 110, and the density of the cellulosic cushioning element 110.

A method of forming the cellulosic cushioning element 110 and a machine assembly 200 used in this method will be described with reference to FIGS. 3A-3D. Initially a sheet 112 of paper is fed on top of a die 210 and, in this embodiment, between a cover plate 212 and the die 210. The sheet 112 includes a face surface 114 with a surface area. The sheet 112 also has a thickness, which as discussed above, can be any suitable thickness. The sheet has a thickness direction and an orthogonal direction that is orthogonal to the thickness direction. In FIG. 3A, the sheet 112 is fed in the orthogonal direction of the sheet 112. The sheet 112 is nipped and fed by a feed roller 202. The feed roller 202 forms a nip with a nip forming member, which in this embodiment is a feed plate 204, but any suitable nip forming member may be used such as another roller. In this embodiment, the sheet 112 is a continuous sheet from a roll 116. However, the sheet 112 may be provided in other suitable forms such a stack of sheets 112 that cut to size and fed one-by-one to the die 210.

The die 210 has a cylindrical hole 214 with a taper 216 at the entrance of the die 210 forming a funnel shape. The sheet 112 is pressed through the die 210 with a plunger 220. The plunger 220 has a shape that corresponds to the shape of the die 210. In this embodiment, the plunger 220 is cylindrical with a spherical tip 222, but any suitable shape may be used. The cylindrical hole 214 of the die 210 has a diameter, and the diameter of the plunger 220 is smaller than the diameter of the cylindrical hole 214 so that the plunger 220 can be inserted into the cylindrical hole 214. The plunger 220 is lowered moving through a hole 218 in the cover plate 212 to press the sheet 112 in a direction crossing the orthogonal direction of the sheet 112, which is the thickness direction in this embodiment. The tip 222 of the plunger 220 contacts the face surface 114 of the sheet 112 and pushes the sheet 112 into the cylindrical hole 214 of the die 210. The sheet 112 has a surface area that is greater than the surface area of the cylindrical hole 214 at the exit of the die 210. As the plunger 220 pushes presses the sheet 112 into the taper 216 and the cylindrical hole 214 of the die 210, the sheet 112 conforms to the shape of the die 210 and the plunger 220 to form a shaped cellulosic sheet 118. Thus, in this embodiment, the shaped cellulosic sheet 118 has a hollow, cylindrical shape with a spherical tip. The plunger 220 is inserted into the cylindrical hole 214 of the die 210 such that the plunger 220 discharges the shaped cellulosic sheet 118 from the exit (bottom) of the die 210.

When the sheet 112 is supplied by the roll 116 a cutter 224 may be used to cut the sheet 112 to the appropriate length. In this embodiment, the cutter 224 is configured to move with the plunger 220 between the top of the die 210 and the feed plate 204. The cutter 224 cuts the sheet 112 just before or as the tip 222 contacts the face surface 114 of the sheet 112 to push the sheet 112 into the die 210.

Figure 3B:
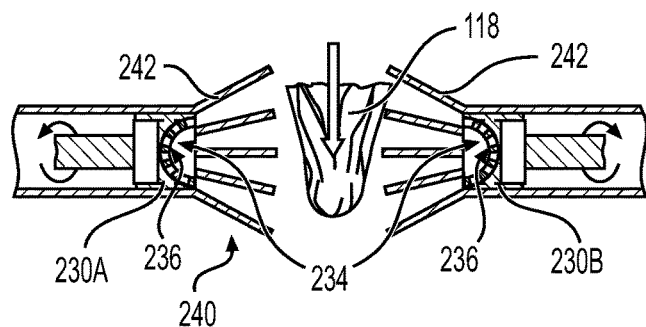
Figure 3C:
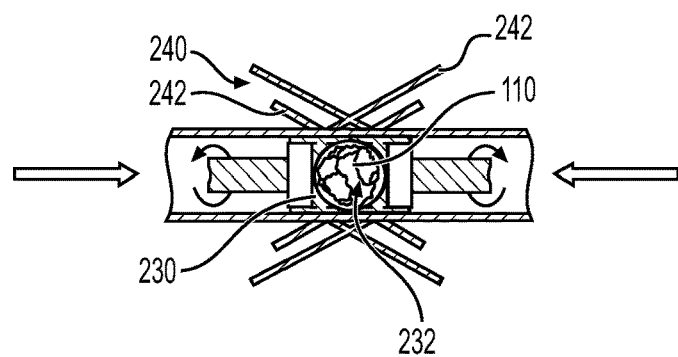

After the shaped cellulosic sheet 118 exits the die 210, the shaped cellulosic sheet 118 passes between a first portion 230A and a second portion 230B of a form 230 as shown in FIG. 3B. The first portion 230A and the second portion 230B of the form 230 are then brought into contact with each other to compress the shaped cellulosic sheet 118 within a cavity 232 of the form 230 as shown in FIG. 3C. Each of the first portion 230A and the second portion 230B of the form 230 have a concavity 234 formed therein that, when the first portion 230A and the second portion 230B are brought together, form a spherical cavity 232. In this embodiment each concavity 234 is hemispherical to form the cavity 232.

The form 230 also includes a catcher 240 to help catch the shaped cellulosic sheet 118 as it passes between the first portion 230A and the second portion 230B of the form 230. The catcher 240 of this embodiment includes a plurality of teeth 242 that are splayed outward from contacting portions of the first portion 230A and the second portion 230B of the form 230. The diverging angles of the teeth 242 help compress and guide the shaped cellulosic sheet 118 into the cavity 232 as the first portion 230A and the second portion 230B are brought together. In this embodiment, the teeth 242 are interlocking teeth 242 such that the teeth 242 of the first portion 230A mesh with the teeth 242 of the second portion 230B.

Figure 3D:
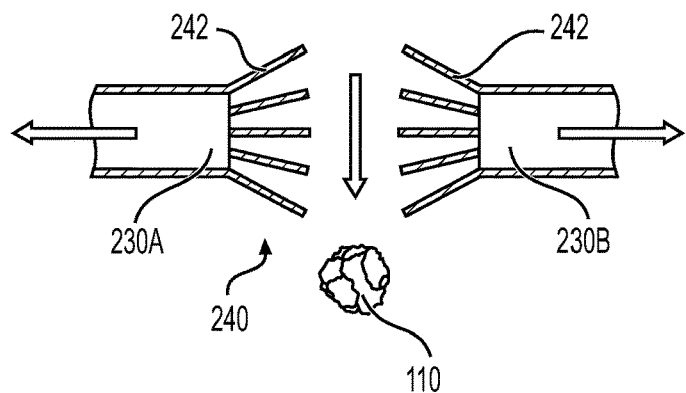

With the shaped cellulosic sheet 118 compressed within the cavity 232 the first portion 230A and the second portion 230B may be rotated about an axis extending in the direction in which the first portion 230A and the second portion 230B are brought together (or separated). Rotating the first portion 230A and the second portion 230B of the form 230 twists the shaped cellulosic sheet 118 and may help create additional folds and pockets in the resulting the cellulosic cushioning element 110. To facilitate this process, each concavity 234 includes an outer surface 236 that is serrated. Compressing and twisting the shaped cellulosic sheet 118 forms the cellulosic cushioning element 110. After the first portion 230A and the second portion 230B are rotated, the first portion 230A and the second portion 230B are separated by being moved in a direction opposite to the direction in which they were brought together. The cellulosic cushioning element 110 is ejected from the form 230 as the first portion 230A and the second portion 230B are separated as shown in FIG. 3D. These steps are repeated to form additional cellulosic cushioning elements 110.

Figure 4A:
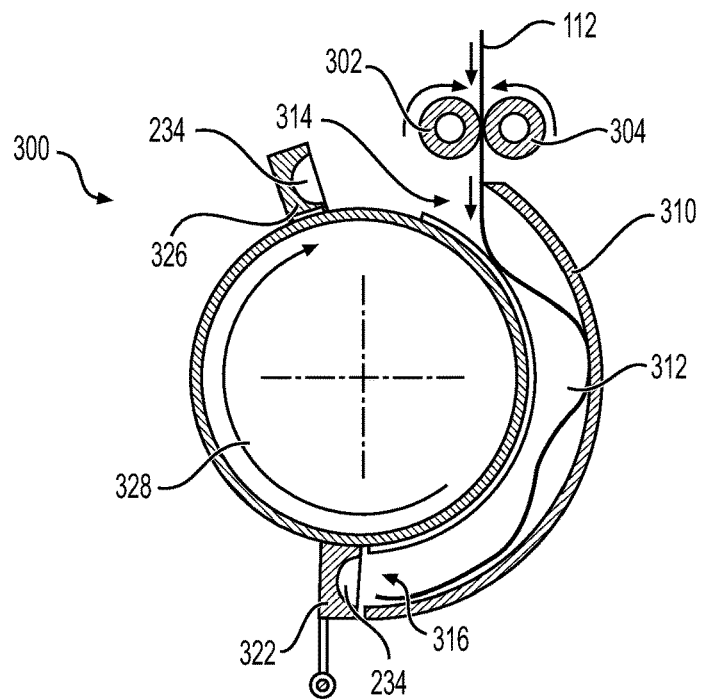
FIGS. 4A-4D show an alternate method and machine used to manufacture the cellulosic cushioning element shown in FIG. 1A.
Figure 4B:
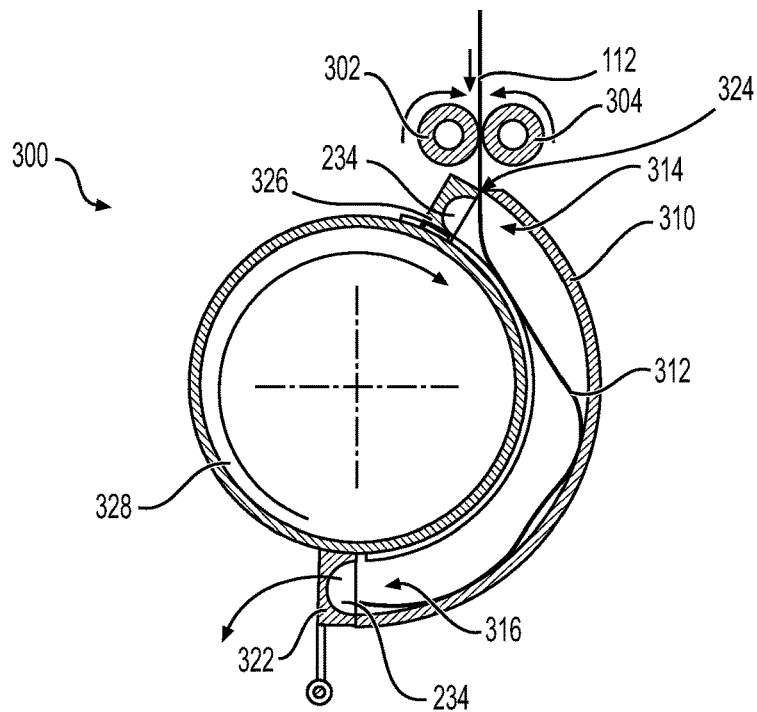
Figure 4C:
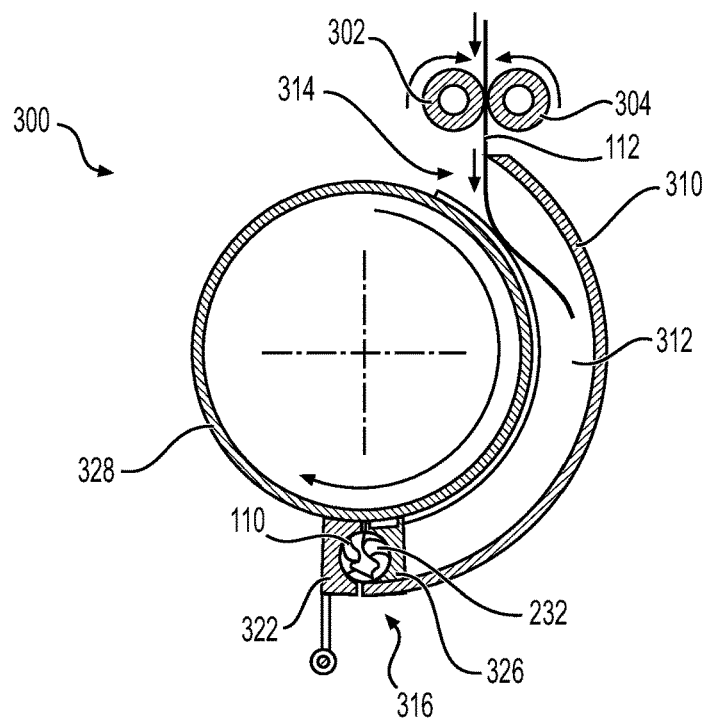

FIGS. 4A-4D show an alternate method for forming the cellulosic cushioning element 110 and a machine assembly 300 used in this method. As in the method and machine assembly 200 described above, a sheet 112 of paper is used to form the cellulosic cushioning element 110. Although the sheet 112 may be similar to those discussed above, the sheet 112 of this embodiment is preferably a strip of paper having a length (as will be further discussed below) longer than its width. The sheet 112 is nipped and fed by a pair of feed rollers (a first feed roller 302 and a second feed roller 304) and fed into an arcuate-shaped cylinder 310 (herein arcuate cylinder 310), as shown in FIG. 4A. FIG. 5 is a perspective view of the first feed roller 302, the second feed roller 304, and the arcuate cylinder 310.

Figure 5:
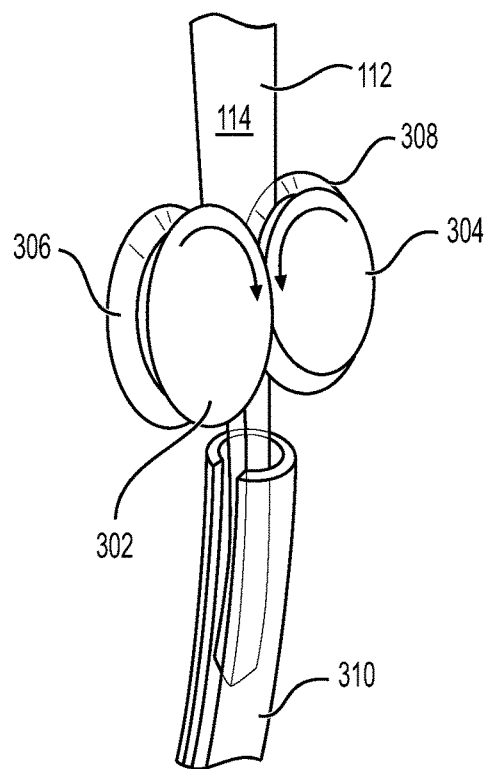
FIG. 5 is a perspective view of feeding rollers that may be used with the method and apparatus shown in FIGS. 4A-4D.
Figure 6A:
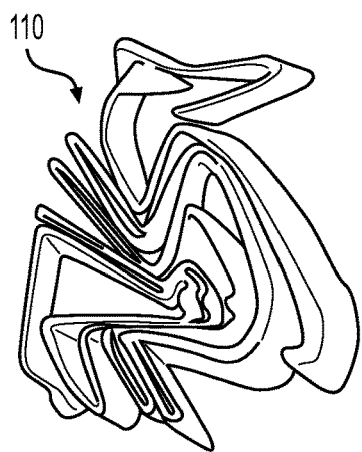
FIGS. 6A and 6B are cellulosic cushioning elements that may be produced by the method and apparatus shown in FIGS. 4A-4D.
Figure 6B:
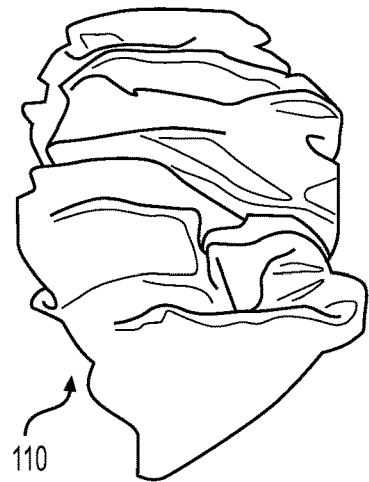

The first feed roller 302 and the second feed roller 304 may have smooth outer surfaces, but they also may be configured to shape the sheet 112 in the thickness direction as the sheet 112 is fed. As shown in FIG. 5, for example, the first feed roller 302 includes a groove 306. The groove 306 of this embodiment is v-shaped, but any suitable shape may be used, including, for example a u-shape or a w-shape. The second feed roller 304 has a corresponding surface, which in this embodiment is a v-shaped protrusion 308. The protrusion 308 presses the sheet 112 into the groove 306 to impart a shape corresponding to the groove 306 and protrusion 308 to the sheet. FIG. 6A shows the cellulosic cushioning element 110 produced using this method and machine assembly 300 when the sheet 112 is fed with the first feed roller 302 and the second feed roller 304 having smooth outer surfaces. The cellulosic cushioning element 110 sheet shown in FIG. 6A has a plurality of folds with gaps therebetween. FIG. 6B shows the cellulosic cushioning element 110 produced using this method and machine assembly 300 when the sheet 112 is fed with the first feed roller 302 and the second feed roller 304 shown in FIG. 5. The cellulosic cushioning element 110 sheet shown in FIG. 6B is similar to the cellulosic cushioning element 110 shown in FIG. 1A, having a plurality of folds, but with a more cylindrical shape instead of spherical.

As shown in FIG. 4A, the arcuate cylinder 310 has a channel 312 formed therein with an inlet 314 and an outlet 316. The sheet 112 is fed into the channel 312 through the inlet 314 and then slides through the channel 312 until it contacts a ram 322 located at the outlet 316. In this embodiment, the sheet 112 (strip of paper) is fed into the channel 312 to have a length longer than the length of the channel 312 and the sheet 112 waves back and forth within the channel 312. However, the length of the sheet 112 is not so limited and it may be shorter, for example.

When the sheet 112 reaches the desired length, it is cut with a cutter 324. In this embedment, the cutter 324 is formed between an edge of the inlet 314 of the arcuate cylinder 310 and a plunger 326. The plunger 326 is connected to a rotor 328 to rotate in a circle. As shown in FIG. 4B, the plunger 326 enters the inlet 314 of the arcuate cylinder 310 and cuts the sheet 112 as it does so. The plunger 326 rotates as it moves along the channel 312 compressing the sheet against the ram 322 the plunger 326. The ram 322 and the plunger 326 of this embodiment are similar to the first portion 230A of the form 230 and second portion 230B of the form 230 discussed above. The ram 322 and the plunger 326 each include a hemispherical concavity 234 and, when brought together as shown in FIG. 4C, form a cavity 232 to compress the sheet 112 and form the cellulosic cushioning element 110. As the plunger 326 continues to rotate, the ram 322 pivots to open the cavity 232 and eject the cellulosic cushioning element 110 as shown in FIG. 4D.

Figure 4D:
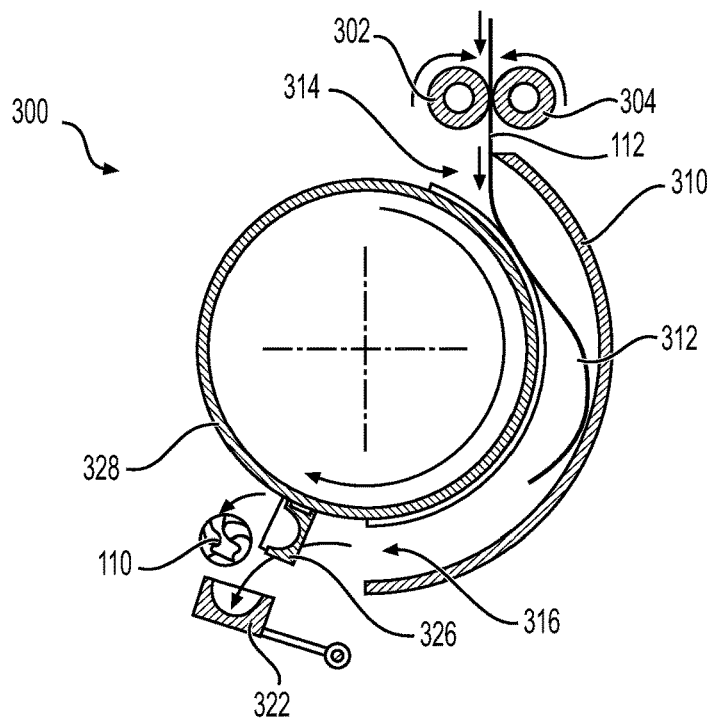

The process shown in FIGS. 4A-4D repeats to form additional cellulosic cushioning elements 110. As can be seen in FIG. 4C, the next sheet 112 is fed into the inlet 314 of the arcuate cylinder 310 after the plunger 326 passes the inlet 314. Accordingly, the next sheet 112 is being fed as the previous sheet 112 is being compressed (FIG. 4C) and ejected as the cellulosic cushioning element 110 (FIG. 4D).

Figure 7A:
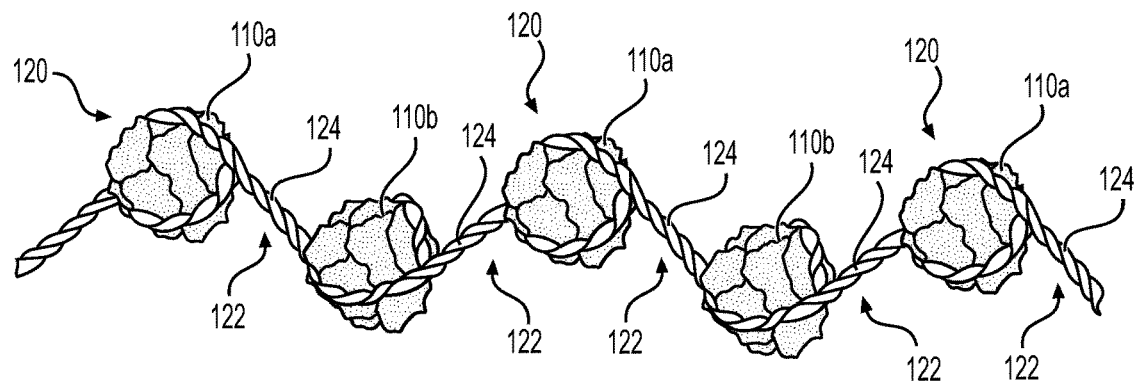
FIGS. 7A and 7B each show a packing material with linkages connecting discrete cushioning elements. The packing material in FIGS. 7A and 7B use the cellulosic cushioning elements shown in FIG. 1A as discrete cushioning elements.
Figure 7B:
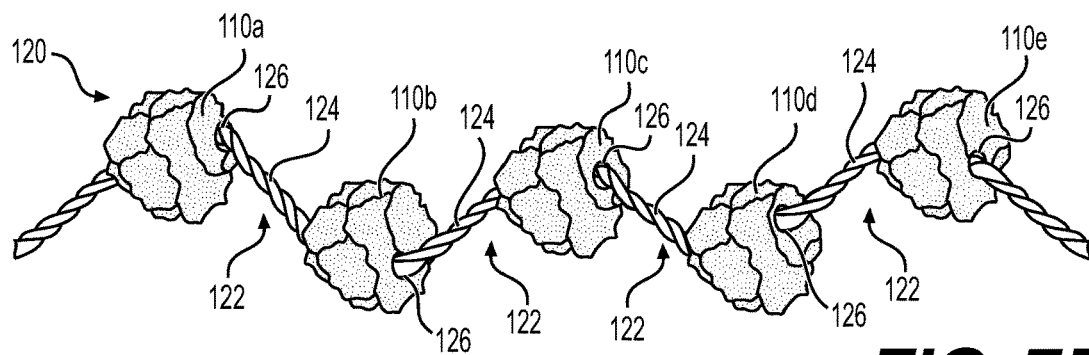

While the plurality of cellulosic cushioning elements 110 are used in a shipping box 102 (as discussed above with reference to in FIG. 2), such a configuration can be messy. When packing or unpacking the item-to-be-shipped 104 the individual cellulosic cushioning elements 110 can easily spill and scatter, requiring the need to clean up. To avoid this issue, each cellulosic cushioning element 110 of a plurality of cellulosic cushioning elements 110 can be connected to one another as shown in FIGS. 7A and 7B. FIGS. 7A and 7B show a packing material according to a preferred embodiment of the invention. For clarity with the other packing materials discussed herein, the packing material of this embodiment is referred to as a rope-like packing material 120.

Figure 8:
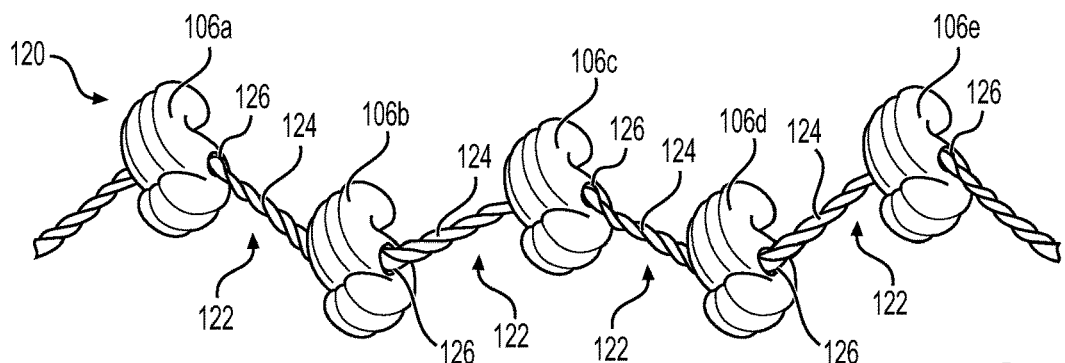
FIG. 8 shows the packing material of FIG. 7B with alternative discrete cushioning elements.

The rope-like packing material 120 includes a plurality of discrete cushioning elements 100 that are arrayed in a length direction A. Each discrete cushioning element 100 of this embodiment is the cellulosic cushioning element 110 discussed above, but they are not so limited. Instead, each discrete cushioning element 100 may be, for example, a packing peanut 106 as shown in FIG. 8. The packing peanut 106 may be a foamed polymer resin material such as the s-shaped polystyrene foam. Other packing peanuts 106 may be used including biodegradable packing peanuts that are made from resin material of a starch such as corn.

The rope-like packing material 120 will be further described with reference to FIGS. 7A and 7B, but it also applies to the other cushioning elements 100 shown in FIG. 8. The cellulosic cushioning element 110 is arrayed in length direction A in an order. FIGS. 7A and 7B show five cellulosic cushioning elements 110 each appended with a different letter (a-e). Each cellulosic cushioning element 110 is adjacent to at least one other cellulosic cushioning element 110. For example, cellulosic cushioning element 110a is adjacent to cellulosic cushioning element 110b, and cellulosic cushioning element 110b is adjacent to both cellulosic cushioning element 110a and cellulosic cushioning element 110c. In this embodiment, the adjacent cellulosic cushioning elements 110 are spaced apart from each other with a gap (referred to as a first gap 122, herein) formed between the adjacent cellulosic cushioning elements 110, although other suitable embodiments may be possible where, for example, adjacent cellulosic cushioning elements 110 contact one another.

The adjacent cellulosic cushioning elements 110 are connected to each other by a flexible linkage 124. The flexible linkage 124 is connected to each cellulosic cushioning element 110 and spans the first gap 122 between adjacent cellulosic cushioning element 110. In this embodiment the flexible linkage 124 is a string. The cellulosic cushioning elements 110 may be attached to the flexible linkage 124 using any suitable method, for example an adhesive. In FIG. 7A, the flexible linkage 124 (string) is wrapped around each cellulosic cushioning element 110 at least one time. In FIG. 7B, each cellulosic cushioning element 110 has a hole 126 formed through the diameter (central portion) of the cellulosic cushioning element 110, and the flexible linkage 124 (string) runs through the hole 126.

Figure 9:
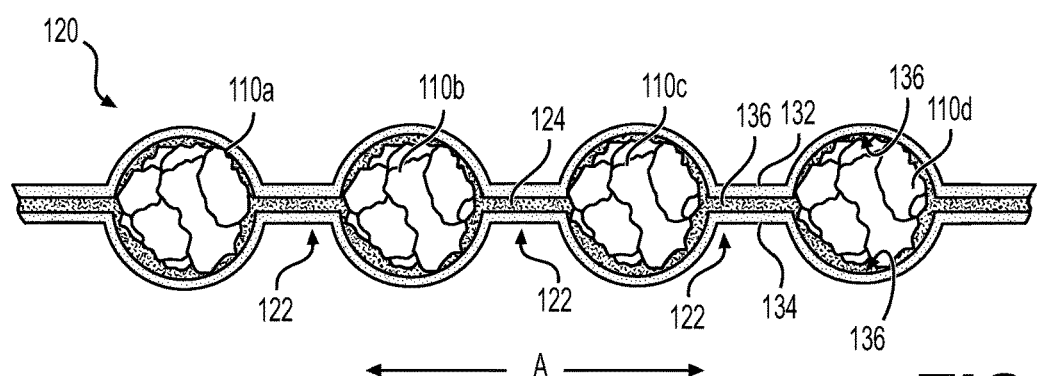
FIG. 9 shows the packing material of FIG. 7A with alternative linkages.

Other suitable flexible linkages 124 may be used. FIG. 9 shows an example of the rope-like packing material 120 with an alternative flexible linkage 124. The flexible linkage 124 of this embodiment includes an upper tape 132 and a lower tape 134. Although any suitable tape can be used, each of the upper tape 132 and lower tape 134 is preferably a paper (or cellulosic) strip that has a length much greater than its width (see FIG. 10). Paper is preferred, particularly when used with the cellulosic cushioning element 110 so that the entire rope-like packing material 120 can be biodegradable and recyclable. In this embodiment, the upper tape 132 and the lower tape 134 are aligned with each other and sandwich the cellulosic cushioning element 110 therebetween. An adhesive 136 is preferably applied to the inner sides of each of the upper tape 132 and the lower tape 134 to bond the upper tape 132 and the lower tape 134 to each other and to the cellulosic cushioning element 110. Any suitable adhesive 136 may be used, but in this embodiment, it is preferably a biodegradable adhesive.

In this embodiment, both the upper tape 132 and the lower tape 134 are used, but it is not so limited and the cellulosic cushioning element 110 may be connected by a single tape (e.g., either the upper tape 132 or the lower tape 134). In such a case, it is preferable to omit or remove the adhesive 136 from the portion of the tape in the first gap 122.

Figure 10:
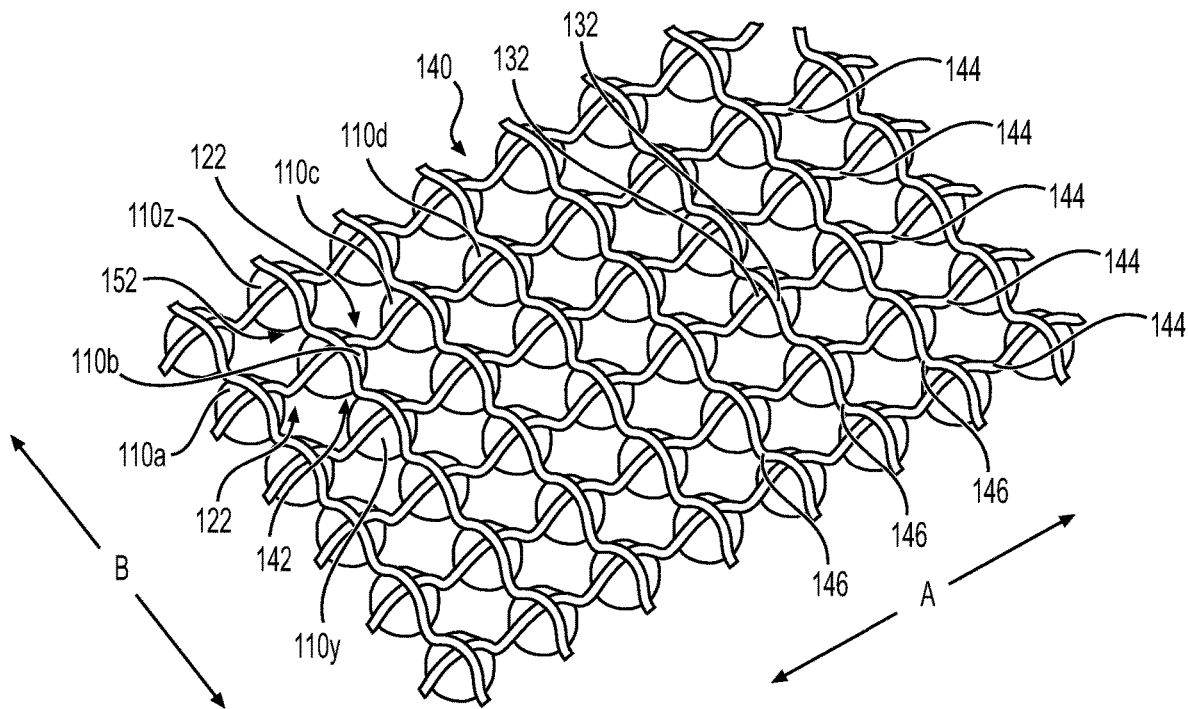
FIG. 10 shows another packing material with linkages connecting discrete cushioning elements. The packing material in FIG. 10 uses the cellulosic cushioning elements shown in FIG. 1A as discrete cushioning elements.

The flexible linkage 124 discussed above may be used with the discrete cushioning elements 100 to form other packing materials. FIG. 10 shows another packing material using the flexible linkage 124 discusses above. For clarity with the other packing materials discussed herein, the packing material of this embodiment is referred to as a net-like packing material 140. As with the other embodiments the cushioning element 100 elements may be any suitable cushioning element, but in this embodiment, the cushioning element 100 is cellulosic cushioning element 110.

The cellulosic cushioning elements 110 of the net-like packing material 140 are arrayed in two directions. The cellulosic cushioning elements 110 are arrayed in the length direction A, as discussed above, and also are arrayed in a width direction B in an order. For example, the cellulosic cushioning element 110b is adjacent to the cellulosic cushioning element 110y and the cellulosic cushioning element 110z in the width direction B, in addition to the cellulosic cushioning element 110a and the cellulosic cushioning element 110c in the length direction A. The width direction B is a direction crossing the length direction A, and in this embodiment, the width direction B is perpendicular to the length direction A.

The cellulosic cushioning elements 110 are also spaced apart with a gap (a second gap 142) formed between adjacent cellulosic cushioning elements 110 in the width direction B. One flexible linkage 124, a first flexible linkage 144 connects the cellulosic cushioning elements 110 in the length direction A and another flexible linkage 124, a second flexible linkage 146) connects the cellulosic cushioning elements 110 in the width direction B. In this embodiment, there are a plurality of first flexible linkages 144 and a plurality of second flexible linkages 146 that are connected together to form the net-like structure of the net-like packing material 140. FIG. 10 shows the first flexible linkage 144 and the second flexible linkage 146 with constructed using the tape (e.g., the upper tape 132 and the lower tape 134), but other suitable flexible linkages 124, such as string, may be used as discussed above.

Figure 11:
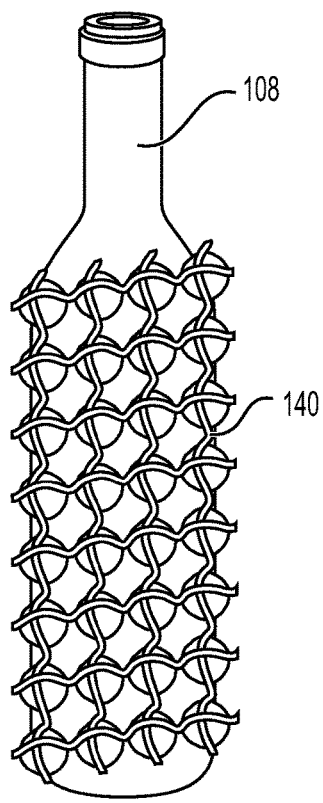
FIG. 11 shows the packing material of FIG. 10 used on a bottle.

The net-like packing material 140 may be used to pack an item-to-be-shipped 104 in the manner shown above in FIG. 1A, but it may also be used in other suitable packing arrangements. For example, the net-like packing material 140 may be used similarly to bubble wrap and be wrapped around an item-to-be-shipped 104 such as a bottle 108, as shown in FIG. 11.

Figure 12:
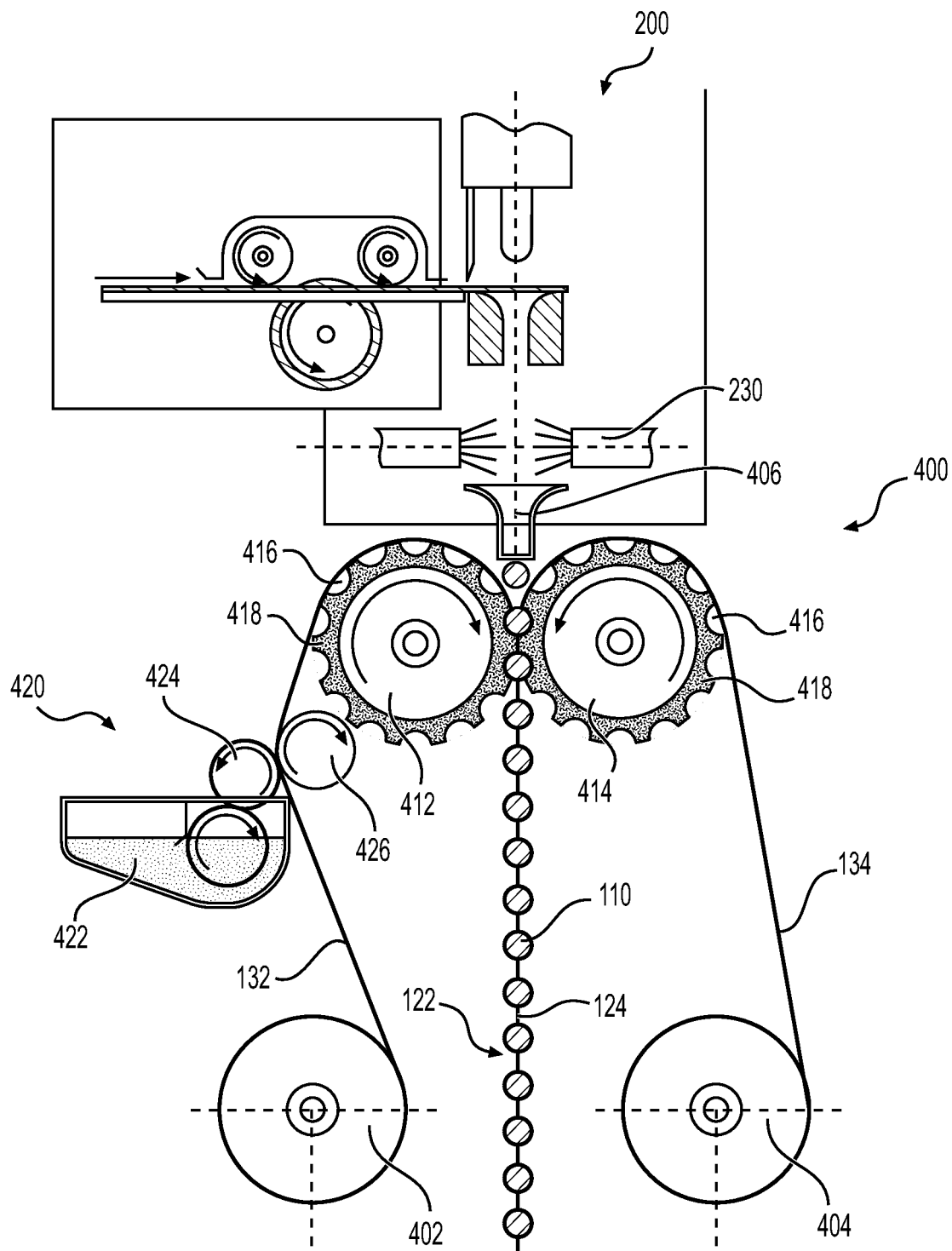
FIG. 12 shows a method of manufacturing the packing material shown in FIG. 9.

A method of forming the rope-like packing material 120 is shown in FIG. 9, and a machine assembly 400 used in this method will be described with reference to FIG. 12. The cellulosic cushioning element 110 may be formed using any suitable method or machine including the machine assembly 200 and machine assembly 300 discussed above. The machine assembly 200 is shown in FIG. 12, for example. The machine assembly 400 shown in FIG. 12 includes a first roll 402 of a strip of paper which will become the upper tape 132 and a second roll 404 of a strip of paper which will become the lower tape 134.

The upper tape 132 is stretched between the first roll 402 and a first laminating roller 412, and the lower tape 134 is stretched between the second roll 404 and a second laminating roller 414. Each of the first laminating roller 412 and the second laminating roller 414 have a plurality of recesses 416 formed in their exterior surface. Between the recesses 416 is a land 418. The first laminating roller 412 and the second laminating roller 414 are posited to form a bonding nip therebetween in which the recesses 416 of each laminating roller oppose each other in the bonding nip and the lands 418 of each laminating roller oppose each other in the bonding nip.

The adhesive 136 is applied to at least one of the upper tape 132 and the lower tape 134. In this embodiment, the adhesive 136 is applied to the upper tape 132 by an adhesive application unit 420. Alternatively, another adhesive application unit 420 may be used to also apply adhesive 136 to the lower tape 134. The adhesive application unit 420 includes a reservoir 422 holding the adhesive 136. The adhesive 136 is transferred from the reservoir 422 to an outer surface of applicating roller 424. The adhesive application unit 420 also includes a backing roller 426, which forms an adhesive application nip with the applicating roller 424. The upper tape 132 passes through the adhesive application nip and the adhesive 136 is applied by the applicating roller 424 to a surface (which will become an inner surface) of the upper tape 132. Other suitable adhesive application units 420 may be used including, for example, spray adhesive applicators.

After the cellulosic cushioning element 110 is formed and discharged from the form 230, the cellulosic cushioning element 110 is guided to the entrance of the nip by, for example, a chute 406. The cellulosic cushioning element 110 is then located in a cavity formed by two opposing recesses 416 and separated from adjacent cellulosic cushioning element 110 by opposing lands 418. The upper tape 132 is sandwiched between the first roll 402 and the cellulosic cushioning element 110, and the lower tape 134 is sandwiched between the second roll 404 and the cellulosic cushioning element 110. As the upper tape 132 and the lower tape 134 pass through the bonding nip without a cellulosic cushioning element 110 between them, the upper tape 132 and the lower tape 134 are bonded to each other to form the first gap 122.

Figure 13:
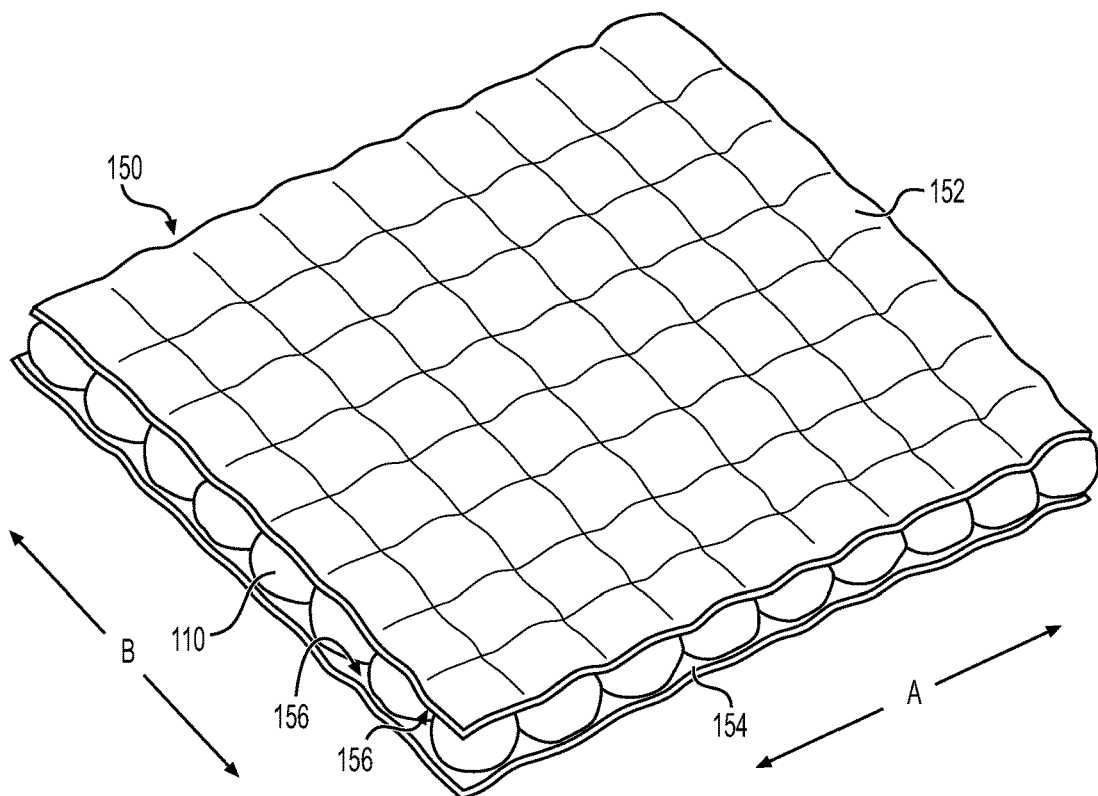
FIG. 13 shows another packing material using the cellulosic cushioning elements shown in FIG. 1A as discrete cushioning elements.

Another packing material is shown in FIG. 13. For clarity with the other packing materials discussed herein, the packing material of this embodiment is referred to as a sandwich wrap 150. The sandwich wrap 150 includes a top sheet 152 and a bottom sheet 154. Although any suitable sheet may be used, the top sheet 152 and the bottom sheet 154 are preferably paper (cellulosic) sheets. The top sheet 152 is connected to the bottom sheet 154 with a plurality of discrete cushioning elements 100 positioned therebetween. As shown in FIG. 13, the discrete cushioning elements 100 of this embodiment are cellulosic cushioning elements 110. In this embodiment, the cellulosic cushioning element 110 are arrayed in the length direction A and in the width direction B. Although gaps may be present between adjacent cellulosic cushioning elements 110. The adjacent cellulosic cushioning elements 110 of this embodiment contact each other. Each of the top sheet 152 and the bottom sheet 154 include an inner surface 156. An adhesive 136 is applied to the inner surface 156 of each of the top sheet 152 and the bottom sheet 154 to attach the cellulosic cushioning element 110 to the top sheet 152 and the bottom sheet 154 and connect the top sheet 152 and the bottom sheet 154 to each other.

Figure 14:
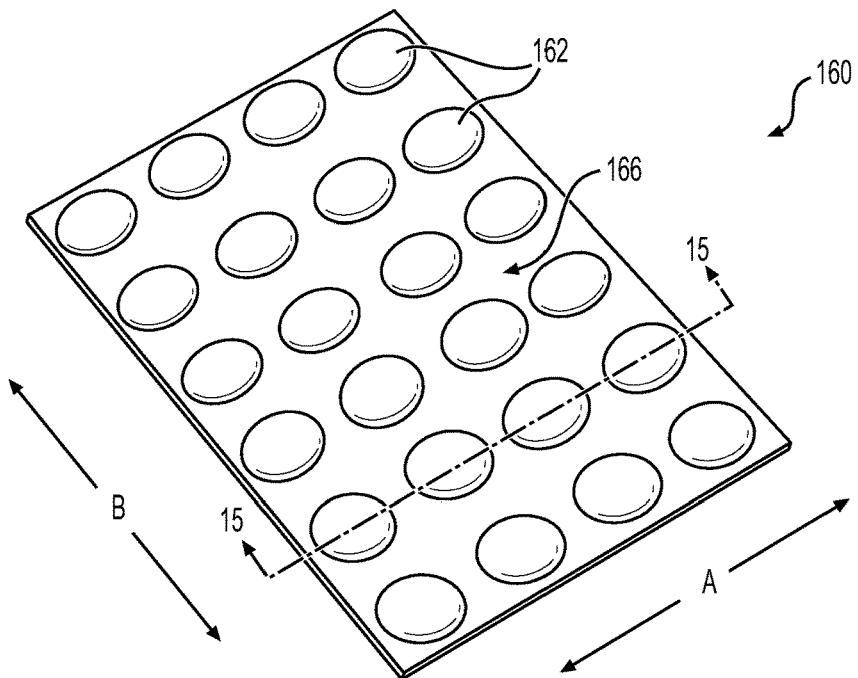
FIG. 14 shows further packing material using the cellulosic cushioning elements shown in FIG. 1A as discrete cushioning elements.
Figure 15:
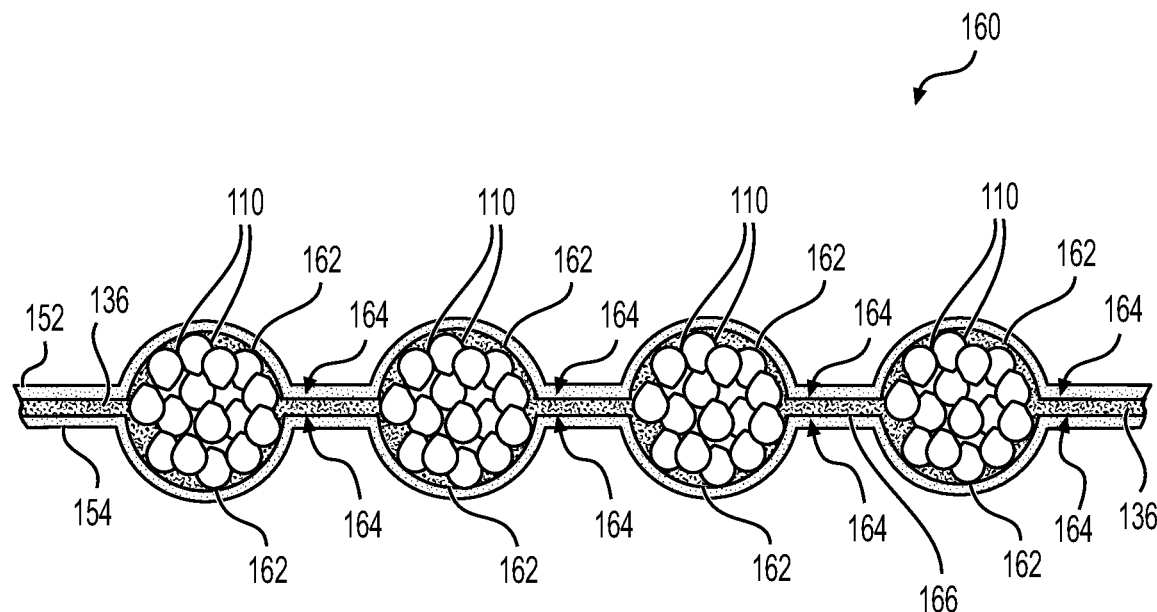
FIG. 15 is a cross-sectional view of the packing material shown in FIG. 14 taken along line 15-15 in FIG. 14.

As noted above, the cushioning elements 100 may be positioned between the top sheet 152 and the bottom sheet 154 with the cushioning elements 100 spaced apart from each other. One such packing material is shown in FIGS. 14 and 15. For clarity with the other packing materials discussed herein, the packing material of this embodiment is referred to as a wrap-like packing material 160. FIG. 15 is a cross-sectional view of the wrap-like packing material 160 taken along line 15-15 in FIG. 14. The wrap-like packing material 160 of this embodiment has similarities to the sandwich wrap 150. For example, the wrap-like packing material 160 includes a top sheet 152 connected to a bottom sheet 154 with cellulosic cushioning elements 110 positioned therebetween. At least one of the top sheet 152 and the bottom sheet 154 includes a plurality of pockets 162. In this embodiment, both the top sheet 152 and the bottom sheet 154 include a plurality of pockets 162. Each of the pockets 162 includes an opening 164. In the wrap-like packing material 160 shown in FIG. 15, each opening 164 of the top sheet 152 opposes a corresponding opening 164 of the bottom sheet 154, forming a combined pocket. An area sounding each pocket 162 or combined pocket is referred to herein as webbing area 166. The top sheet 152 and bottom sheet 154 are adhered to each other using, for example, the adhesive 136 discussed above in the webbing area 166.

Figure 16:
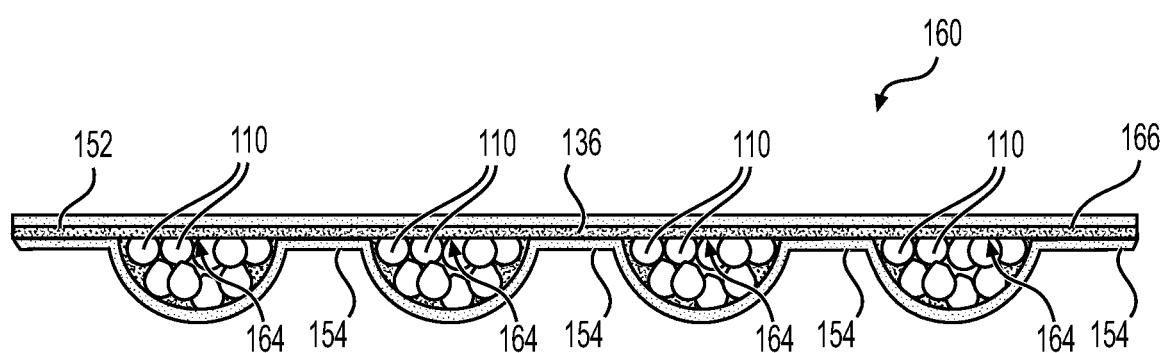
FIG. 16 is an alternate cross-sectional view of the packing material shown in FIG. 14 taken along line 15-15 in FIG. 14.

At least one cellulosic cushioning element 110 is located in each combined pocket. In this embodiment, each pocket 162 includes a plurality of cellulosic cushioning elements 110. The plurality of cellulosic cushioning elements 110 in each pocket 162 or combined pocket may be bonded to each other with bonds comprising adhesive and cellulosic fibers, as will be described further below. Instead of both the top sheet 152 and the bottom sheet 154 having a plurality of pockets 162, pockets 162 may be formed in one of the top sheet 152 and the bottom sheet 154. FIG. 16 is a cross-sectional view of the wrap-like packing material 160 taken along line 15-15 in FIG. 14, where a plurality of pockets 162 are formed in the bottom sheet 154 but not the top sheet 152. In this embodiment, the top sheet 152 is bonded to the bottom sheet 154 such that the top sheet 152 covers the openings 164 of the plurality of pockets 162 in the bottom sheet 154.

Figure 17:
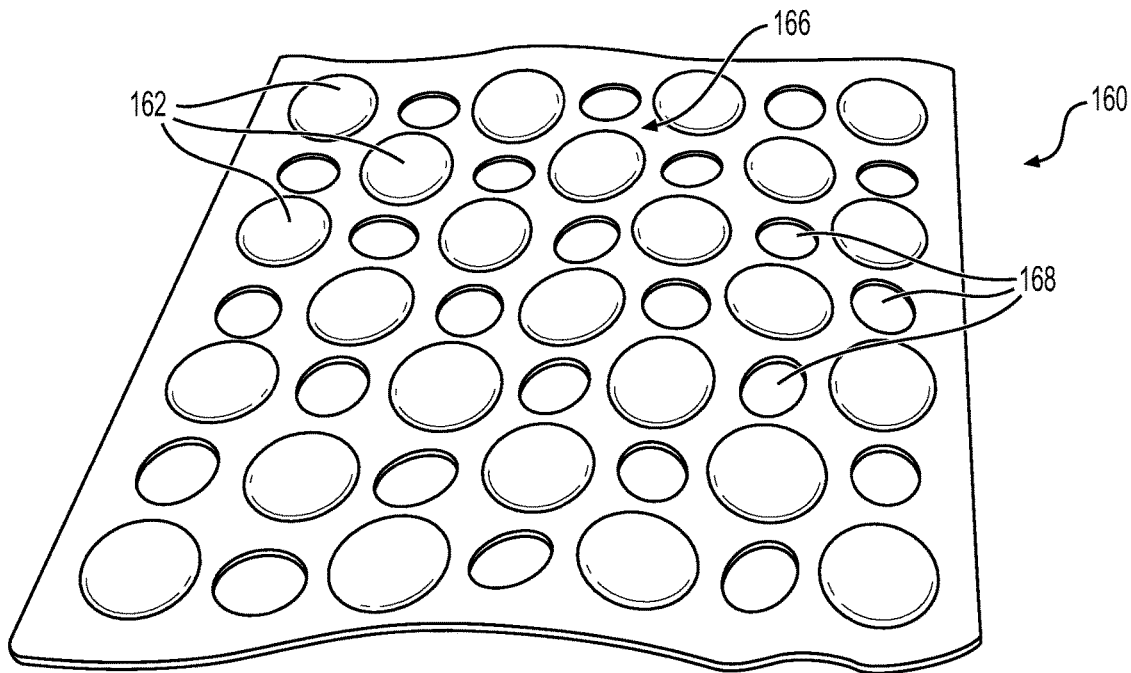
FIG. 17 shows a variation of the packing material shown in FIG. 14.
Figure 18:
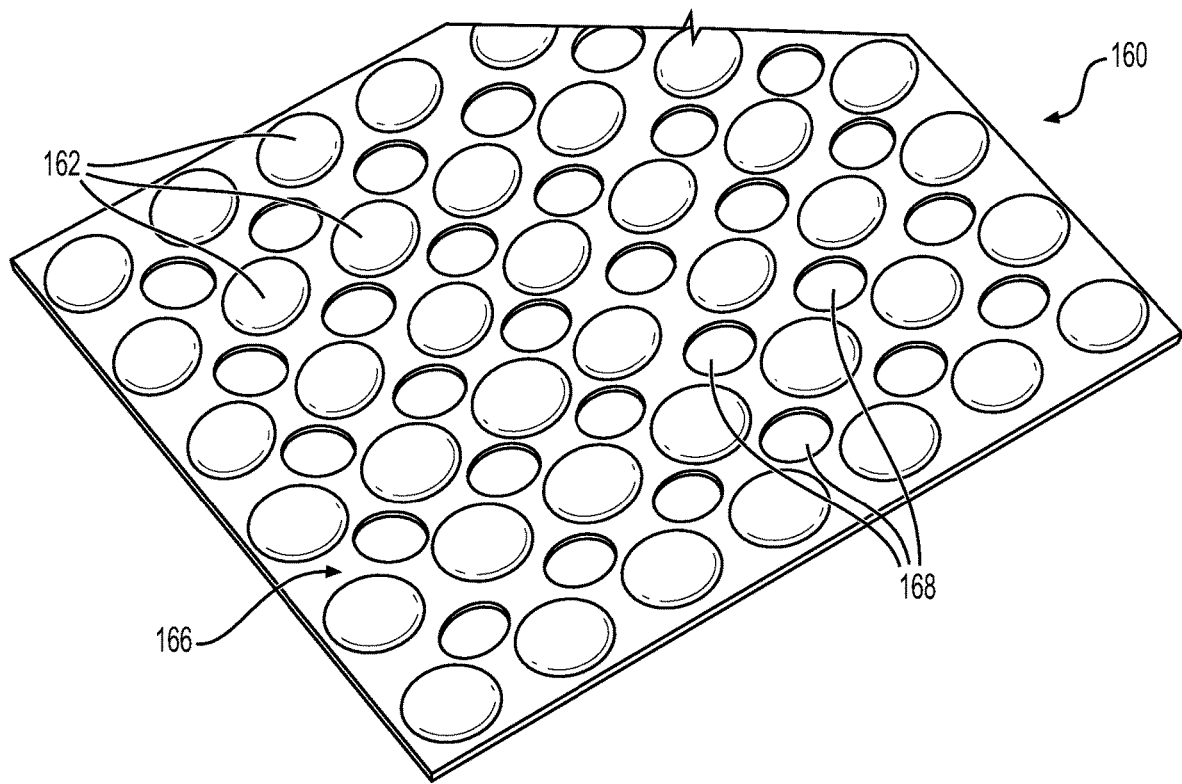
FIG. 18 shows another variation of the packing material shown in FIG. 14.

To increase the flexibility of the wrap-like packing material 160, a plurality of holes 168 may be formed through both the top sheet 152 and the bottom sheet 154, as shown in FIGS. 17 and 18. The wrap-like packing material 160 shown in FIG. 17 has the holes 168 located between each pocket 162 in the length direction A and in the width direction B. Another configuration for the wrap-like packing material 160 with holes 168 is shown in FIG. 18 in which the holes 168 are formed in interstitial portions between the pockets 162.

When a single cellulosic cushioning element 110 is located in each combined pocket of the wrap-like packing material 160, a modified method and machine assembly 400 shown and discussed above with reference to FIG. 12 may be used. The first laminating roller 412 and the second laminating roller 414 may be longer and the machine assembly 200 is configured to place a plurality of cellulosic cushioning elements 110 along the length of the first laminating roller 412 and the second laminating roller 414. Instead of the first roll 402 and the second roll 404 being tape, they may be rolls of paper used to form the top sheet 152 and the bottom sheet 154.

Figure 19:
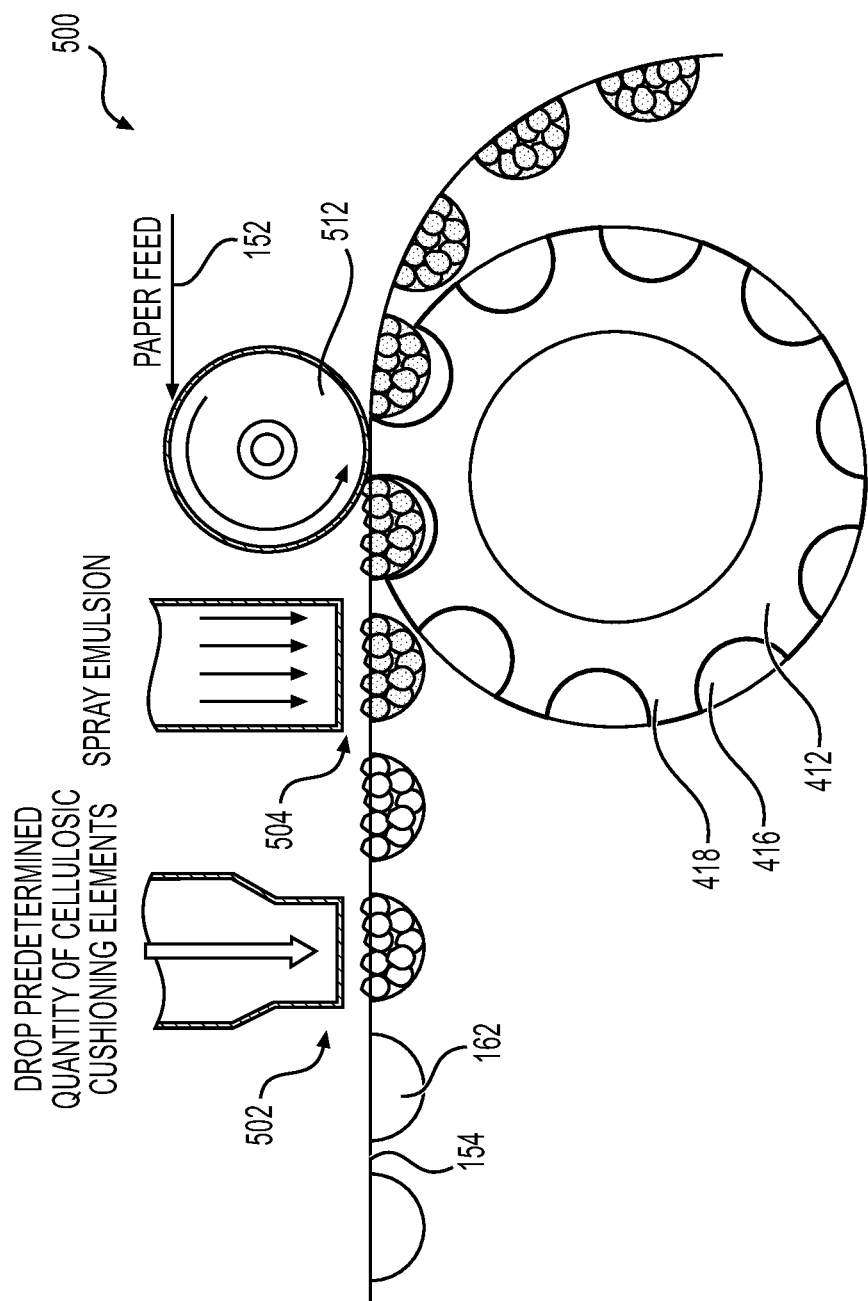
FIG. 19 shows a method and machine used to manufacture the packing material shown in FIG. 14.

A method of forming the wrap-like packing material 160 shown in FIG. 16 and a machine assembly 500 used in this method will be described with reference to FIG. 19. The bottom sheet 154 is provided with the plurality of pockets 162 formed therein. At a first station 502, the plurality of cellulosic cushioning elements 110 are filled in each pocket 162. Optionally, at a second station 504, the cellulosic cushioning elements 110 in each pocket 162 may be bonded together. The cellulosic cushioning elements 110 may be bonded together by an adhesive, which is preferably a biodegradable adhesive. Even more preferably, an emulsion of water, adhesive, and cellulosic (paper) fibers are sprayed into each pocket 162 at the second station 504. Each pocket 162 is conveyed and supported by a backing member, such as by the first laminating roller 412 discussed above, through a bonding nip formed between the first laminating roller 412 and a press roller 512. The top sheet 152 may be conveyed by the press roller 512 into the bonding nip and the top sheet 152 is bonded to the bottom sheet 154. Where the emulsion is used, the emulsion may then be dried resulting in a plurality of cellulosic cushioning elements 110 that are bonded by bonds comprising cellulosic fibers and the adhesive and/or a matrix of cellulosic fibers and the adhesive, as discussed further below in connection with the molded packing material 170.

Instead of using a sheet of paper alone as top sheet 152, a top sheet 152 with pockets 162 filled with cellulosic cushioning elements 110 and optionally bonded may formed in a manner similar to the bottom sheet 154, as discussed above. This top sheet 152 with pockets may then be brought together with the bottom sheet 154 in the bonding nip to form the wrap like packing material shown in FIG. 15. Alternatively, two of the wrap-like packing materials 160 shown in FIG. 16 may be brought together to form the wrap-like packing material 160 shown in FIG. 15. In any of these cases, the top sheet 152 and the bottom sheet 154 may be bonded together with an adhesive, which is preferably a biodegradable adhesive.

Figure 20:
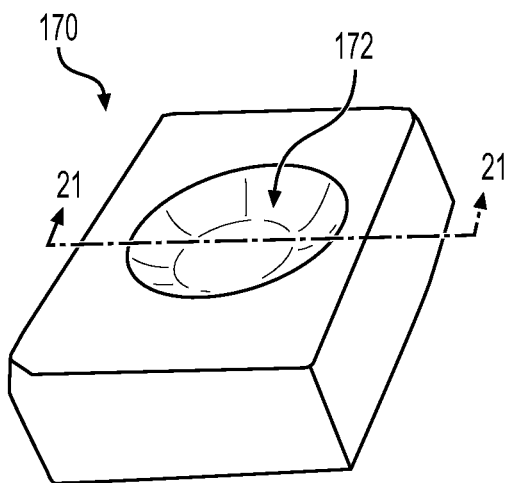
FIG. 20 shows a further packing material using the cellulosic cushioning elements shown in FIG. 1A.
Figure 21:
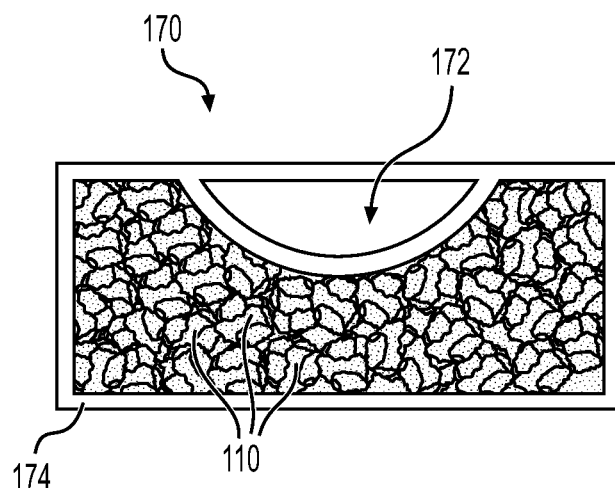
FIG. 21 is a cross-sectional view of the packing material shown in FIG. 20 taken along line 21-21 in FIG. 20.

The cellulosic cushioning elements 110 discussed herein may also be suitable to make a polystyrene foam (or other plastic foam) replacement. FIGS. 20 and 21 show such a packing material according to a preferred embodiment of the invention. For clarity with the other packing materials discussed herein, the packing material of this embodiment is referred to as a molded packing material 170. The molded packing material 170 is shown in FIG. 20, and FIG. 21 is a cross section of the molded packing material 170 shown in FIG. 20 taken along line 21-21 in FIG. 20.

The molded packing material 170 will be formed into a shape in order to pack the item-to-be-shipped 104. Such molded shape may include recesses and protrusions. For example, the molded packing material 170 shown in FIG. 20 includes a hemispherical cavity 172 in which a portion of the item-to-be-shipped 104 can be placed. The molded packing material 170 of this embodiment includes a plurality of cellulosic cushioning elements 110 that are formed into the desired shape and then joined together. The plurality of cellulosic cushioning elements 110 may be joined together by bonds comprising adhesive and cellulosic (paper) fibers. In some embodiments, the plurality of cellulosic cushioning elements 110 may be joined together by a matrix of cellulosic fibers, and in a preferred embodiment, a matrix of cellulosic (paper) fibers and an adhesive. Additional features of the bonds and matrix will be discussed below in connection with the method of manufacturing the molded packing material 170. Optionally, the outer surfaces of the molded packing material 170 may be covered with an outer sheet 174. The outer sheet 174 is preferably a cellulosic (paper) sheet.

Figure 22:
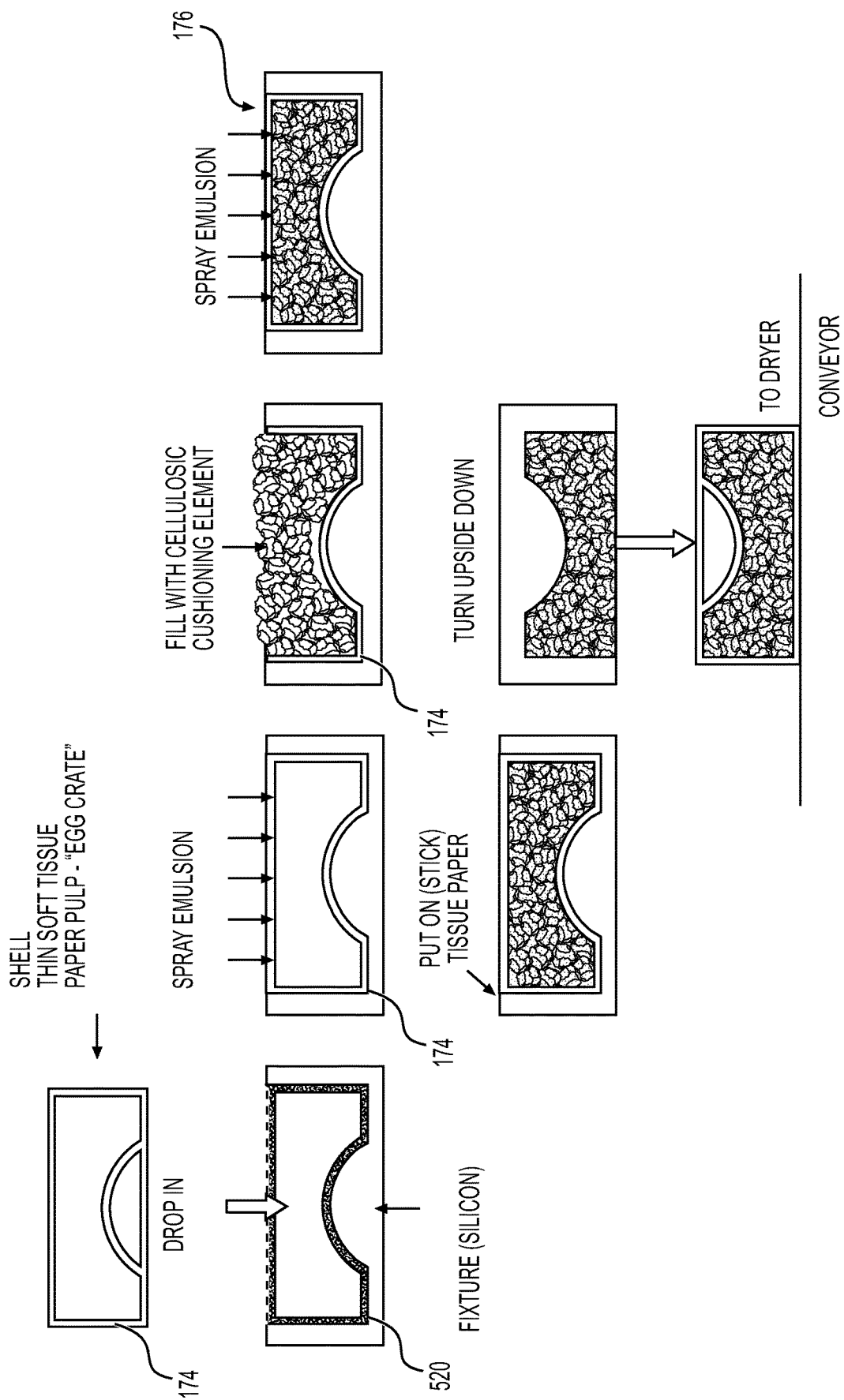
FIG. 22 shows a method and machine used to manufacture the packing material shown in FIG. 20.

A method of manufacturing the molded packing material 170 shown in FIG. 20 will be described with reference to FIG. 22. First, a mold 520 having the desired shape is provided. The mold 520 may preferably be silicon. If an outer sheet 174 is used, the outer sheet 174 is placed into the mold. The mold 520 is then filled with the cellulosic cushioning elements 110. Next, an emulsion of water, cellulosic (paper) fibers, and preferably adhesive is sprayed into the mold 520 with the cellulosic cushioning elements 110. The emulsion flows around and between the cellulosic cushioning elements 110. In addition, the emulsion may also flow at least a portion of the way into crevices exposed on the outer surfaces of the plurality of cellulosic cushioning elements 110. If the outer sheet 174 is used, the outer sheet 174 may be placed on top of an exposed surface 176 of the cellulosic cushioning elements 110. The cellulosic cushioning elements 110 with the emulsion is then removed from the mold 520, such as by turning the mold 520 upside down, and then dried to form the molded packing material 170. The drying step may also take place before removing the cellulosic cushioning elements 110 from the mold 520.

As the cellulosic cushioning elements 110 with the emulsion is dried bonds form between the folds of each of the cellulosic cushioning elements 110 and also between the cellulosic cushioning elements 110. The emulsion may also form, as it is dried, a matrix around the cellulosic cushioning elements 110, and the cellulosic cushioning elements 110 may be connected to each other by the cellulosic fibers and, when used, the adhesive of the matrix. The molded packing material 170 may thus include a plurality of cellulosic cushioning elements 110 that are interconnected to each other by cellulosic fibers. The cellulosic cushioning elements 110 may retain some of the air pockets therein, and the molded packing material 170 may also be described as having discrete groupings of air (gas) pockets interspersed within a cellulosic (paper) mass.

As discussed above, factors impacting the amount of energy absorbed include the weight of the paper, the volume or size (e.g., diameter) of the cellulosic cushioning element 110, and the density of the cellulosic cushioning element 110. In this embodiment, the amount of emulsion and the amount of the cellulosic fibers and the amount of adhesive in the emulsion may also be modified to create a packing material with the desired strength and energy absorbing properties. The emulsions discussed herein may be referred to herein as an aqueous slurry of cellulosic fibers and adhesive. In the emulsions discussed herein the cellulosic fibers are preferably the same fibers as are used in the paper for the cellulosic cushioning element 110. In addition, the adhesive of the emulsion is preferably a biodegradable emulsion.

Although this invention has been described with respect to certain specific exemplary embodiments, many additional modifications and variations will be apparent to those skilled in the art, in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of manufacturing packing material comprising:
   providing a cellulosic sheet having a thickness and a face surface, the face surface having a surface area, the cellulosic sheet having a thickness direction and an orthogonal direction that is orthogonal to the thickness direction;
   shaping the cellulosic sheet to form a shaped cellulosic sheet;
   compressing the shaped cellulosic sheet to form a compressed cellulosic sheet; and
   twisting the compressed cellulosic sheet to form a crumpled cellulosic sheet.

2. The method according to claim 1, wherein providing the cellulosic sheet includes:
feeding a continuous cellulosic sheet from a roll of the continuous cellulosic sheet; and
cutting of the continuous cellulosic sheet to form the cellulosic sheet.

3. The method according to claim 1, wherein shaping the cellulosic sheet includes pressing the cellulosic sheet through a die to form the shaped cellulosic sheet, the cellulosic sheet being pressed in a direction crossing the orthogonal direction, the die having an exit with an area that is smaller than the surface area of the face surface of the cellulosic sheet,
wherein the pressing step is performed before the compressing step and the shaped cellulosic sheet is compressed in the compressing step to form the compressed cellulosic sheet.

4. The method according to claim 3, wherein a plunger is used to press the cellulosic sheet through the die.

5. The method according to claim 4, wherein the die has a cylindrical shape with a diameter and the plunger has a cylindrical shape with a diameter, the diameter of the plunger being smaller than the diameter of the die such that the plunger is pressed into the cylindrical shape of the die, the shaped cellulosic sheet having a hollow, cylindrical shape.

6. The method according to claim 5, wherein the plunger has a rounded tip and the shaped cellulosic sheet is open at a top end and rounded at a bottom end.

7. The method according to claim 1, wherein the cellulosic sheet is compressed within a cavity of a form.

8. The method according to claim 7, wherein the cavity has an outer surface and the outer surface is serrated.

9. The method according to claim 7, wherein the form has a first portion and a second portion, and
wherein the compressing step includes bringing the first portion into contact with the second portion to compress the cellulosic sheet within the cavity.

10. The method according to claim 9, wherein each of the first portion and the second portion include a concavity, the concavity of the first portion and the concavity of the second portion creating the cavity of the form when the first portion and the second portion are brought together.

11. The method according to claim 10, wherein the concavity of each of the first portion and the second portion is a hemispherical shape.

12. The method according to claim 1, further comprising:
placing the crumpled cellulosic sheet between a first outer sheet of a cellulosic material and a second outer sheet of a cellulosic material; and
attaching the first outer sheet to the second outer sheet.

13. The method according to claim 12, wherein the crumpled cellulosic sheet has a width and each of the first outer sheet to the second outer sheet have a width that is less than the width of the crumpled cellulosic sheet.

14. The method according to claim 12, wherein each of the first outer sheet to the second outer sheet is a tape with an adhesive on surfaces of the first outer sheet to the second outer sheet that face each other.

15. A method of manufacturing packing material comprising:
providing a cellulosic sheet having a thickness and a face surface, the face surface having a surface area, the cellulosic sheet having a length direction, a width direction, and a thickness direction, the cellulosic sheet having, in the length direction, a first end and a second end;
feeding the cellulosic sheet into a channel having an inlet and outlet, the first end being feed into the inlet of the channel before the second end; and
compressing the cellulosic sheet in the length direction to form a compressed cellulosic sheet.

16. The method according to claim 15, wherein the cellulosic sheet is a strip having a length in the length direction longer than the length in the width direction.

17. The method according to claim 15, wherein the cellulosic sheet is compressed within a cavity of a form, the form having a first portion and a second portion, and
wherein the compressing step includes bringing the first portion into contact with the second portion to compress the cellulosic sheet within the cavity.

18. The method according to claim 17, wherein each of the first portion and the second portion include a concavity, the concavity of the first portion and the concavity of the second portion creating the cavity of the form when the first portion and the second portion are brought together, and
wherein the concavity of each of the first portion and the second portion is a hemispherical shape.

19. The method according to claim 17, wherein, in the compressing step, the second portion of the form is located at outlet of the channel and the first portion of the form moves in the channel from inlet towards the outlet with the cellulosic sheet positioned therebetween to compress the cellulosic sheet between the first portion of the form and the second portion of the form.

20. The method according to claim 19, further comprising cutting the cellulosic sheet to form the second end when the first portion of the form enters the inlet of the channel.

21. The method according to claim 19, further comprising shaping the cellulosic sheet in the thickness direction.

22. The method according to claim 21, wherein the cellulosic sheet is shaped in the thickness direction as the sheet is fed.

23. The method according to claim 22, wherein the cellulosic sheet is shaped and fed in a nip formed between a first feed roller and a second feed roller, the first feed roller including a groove having a shape and the second feed roller having a protrusion that corresponds to the shape of the groove.

* * * * *